United States Patent
Tikkanen et al.

(10) Patent No.: US 6,316,896 B1
(45) Date of Patent: Nov. 13, 2001

(54) MAN MACHINE INTERFACE FOR AN A-C MOTOR BYPASS

(75) Inventors: Kari A. Tikkanen, New Berlin; Donald J. Truettner, Waukesha; Charles J. Dubats, New Berlin, all of WI (US)

(73) Assignee: ABB Automation Inc., Norwalk, CT (US)

( * ) Notice: Subject to any disclaimer, the term of this patent is extended or adjusted under 35 U.S.C. 154(b) by 0 days.

(21) Appl. No.: 09/619,287

(22) Filed: Jul. 19, 2000

(51) Int. Cl.[7] .............................. H02H 7/08; H01H 3/12; H01H 7/00
(52) U.S. Cl. .......................... 318/446; 318/454; 307/39; 307/40
(58) Field of Search ................................... 318/445, 446, 318/452, 453, 454, 549, 550, 552, 553, 554, 555, 558; 307/38, 39, 40, 85, 86, 112, 116, 139, 141

(56) References Cited

U.S. PATENT DOCUMENTS

| | | | |
|---|---|---|---|
| 4,521,845 | * | 6/1985 | Schwefel ........................ 318/591 X |
| 5,619,453 | * | 4/1997 | Roohparvar et al. ........... 365/185.33 |
| 5,949,251 | * | 9/1999 | Chambers ............................... 326/46 |
| 6,160,365 | * | 12/2000 | Younger et al. ........................ 318/16 |

\* cited by examiner

Primary Examiner—Bentsu Ro
(74) Attorney, Agent, or Firm—Michael M. Rickin

(57) ABSTRACT

A man machine interface for an A-C motor bypass has a membrane keypad with a multiplicity of pushbuttons connected to a micro-controller. The micro-controller controls the flow of current to the coil of each of the drive and bypass contactors to thereby open or close those contactors depending on if the motor is to be driven and how it is to be driven. The micro-controller includes code that simulates a first state machine that determines the operating condition of the drive and bypass contactors and if it is desired to open that one of the two contactors which is presently open and close that one of the two contactors when is presently open. The micro-controller includes code which simulates a second state machine which is active only when the inverter contactor is open. This state machine determines if the motor is to run or stop and closes or opens the bypass contactor accordingly. The micro-controller includes a non-volatile memory that is used to store the last operating mode of the bypass operating condition if that mode was either automatic operation of the motor, that is, the motor is connected to an A-C source through the inverter in the bypass, or off.

4 Claims, 3 Drawing Sheets

MAN MACHINE INTERFACE FOR AN A-C MOTOR BYPASS

1. FIELD OF THE INVENTION

This invention relates to an A-C motor bypass and more particularly to the man machine interface in such a bypass.

2. DESCRIPTION OF THE PRIOR ART

A-C motors are used in many applications including heating, ventilation and air conditioning and also to drive pumps and fans. Typically the A-C motor is driven by a bypass that is connected between the source of A-C power and the motor. The bypass includes an electronic inverter, which under normal conditions provides power to the motor and controls the speed thereof based on load. The bypass also includes two or three contactors. In the event of an inverter malfunction, the bypass opens a contactor, known either as the drive or inverter contactor (the terms "drive" and "inverter" are used interchangeably herein to refer that contactor), which disconnects the inverter from the load motor and closes another contactor, known as the bypass contactor, which connects the motor to the AC powerline. This feature of bypass is needed when a process is deemed critical and cannot be interrupted due to an inverter failure.

Bypasses have typically used discrete pilot devices, such as incandescent lamps and transformers, and push buttons that are wired in such a way as to perform the logical operation of the unit. This method of controlling the bypass becomes a time consuming task as each wire needs to be properly run and terminated. Furthermore the prices of the pilot devices add cost to the complete design. In addition, such a design does not have any flexibility and intelligence, and is large in size.

Therefore it is desired to provide a man machine interface in a bypass which is relatively inexpensive to make and assemble, and is small in size and has both flexibility and intelligence.

SUMMARY OF THE INVENTION

A bypass for an A-C motor. The bypass has an inverter. The bypass operates in a first mode in which the inverter provides power to the motor and a second mode in which the inverter does not provide power to the motor. The bypass also has firrst and second contactors. The first contactor is closed and the second contactor open when the bypass is operating in the first mode. The bypass further has a first state machine that has a closed loop which has a predetermined total number of states. The first state machine is in a first state when the first contactor is closed and the second contactor is open. The state machine enters a second state when the first state machine determines that one of a predetermined number of events the occurrence of which will result in the opening of the first contactor has occurred. The second state has a predetermined period of time for which the occurring one of the predetermined number of events must continue before the first state machine enters a third state wherein first contactor is opened to thereby stop the motor.

DESCRIPTION OF THE PREFERRED EMBODIMENT(S)

Figure 1:
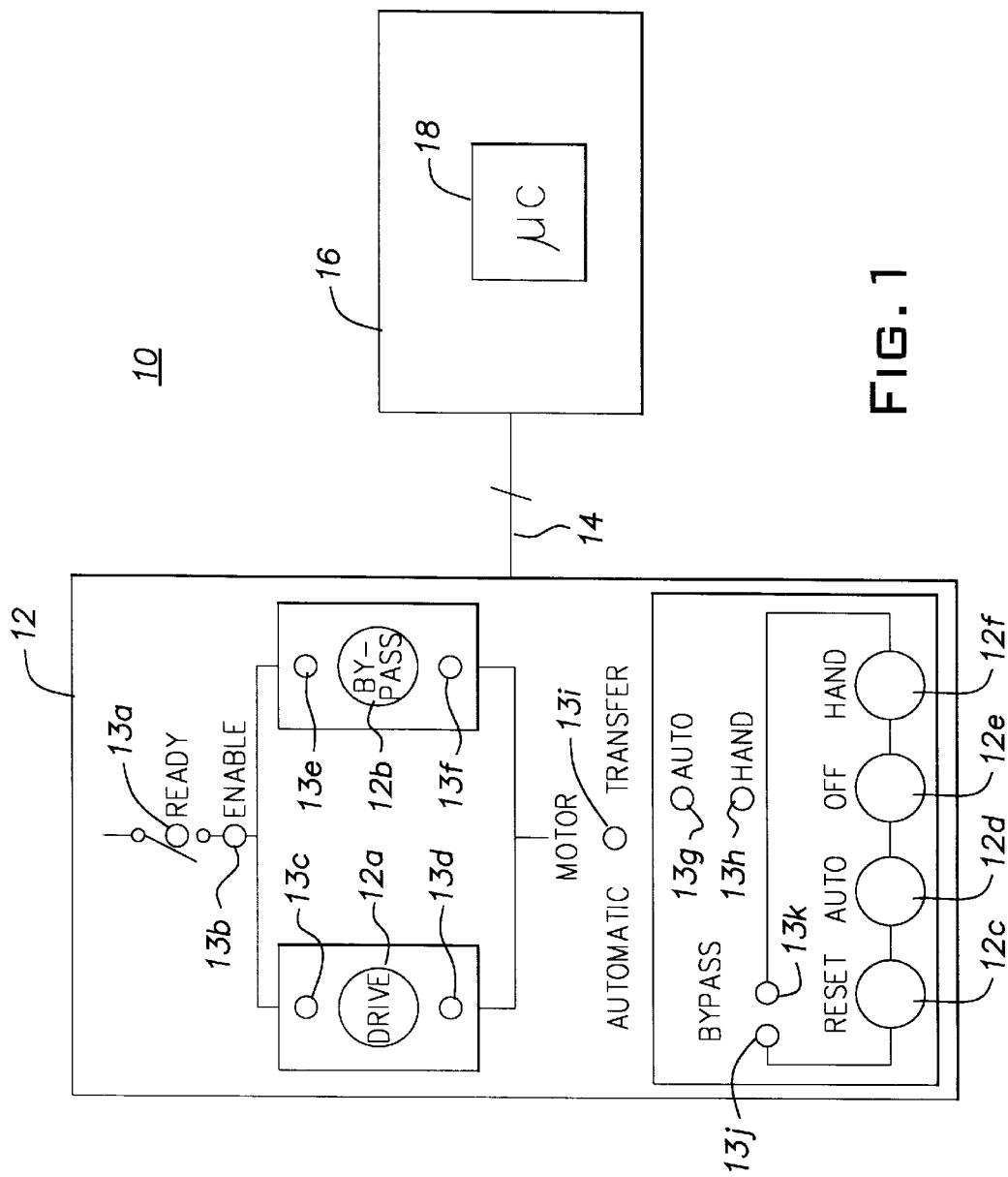
FIG. 1 shows a schematic block diagram of the man machine interface of the present invention.

Referring now to FIG. 1, there is shown a schematic block diagram of the man machine interface 10 of the present invention. The interface 10, which is part of the bypass, includes a membrane keypad 12 having six pushbuttons 12a–12f which are either labeled on the pushbutton or directly above the bushputton as DRIVE 12a, BYPASS 12b, RESET 12c, AUTO 12d, OFF 12e and HAND 12f. The keypad 12 also has eleven light emitting diodes (LEDs) 13a–13k. The pushbuttons 12a–12f and the LEDs 13a–13k are connected by a multiconductor cable 14, such as a ribbon cable, to a control board 16

Mounted on the control board 16 is a $\mu$-controller 18. The pushbuttons 12a–12f and the LEDs 13a–13k on the keypad 12 are connected through the control board 16 to the I/O ports of the $\mu$-controller 18. The $\mu$-controller 18 controls the LEDs and also provides the signals which are used to enable or disable current flow to the coil of each of the drive and bypass contactors so that the contactors can be either open or closed depending on if the motor is to be driven and how the motor is to be driven.

The bypass has two active operating modes. They are an automatic mode the corresponding pushbutton for which is 12d AUTO, wherein the $\mu$-controller 18 controls the operation of the motor; and a hand mode the corresponding pushbutton for which is 12f HAND, wherein the user of the bypass controls the operation of the motor. The bypass also has a passive or off operating mode the corresponding pushbutton for which is 12e OFF. The bypass further has two operating conditions when it is desired to run the motor. In one condition the drive contactor is closed and the inverter controls the motor and in the other condition the bypass contactor is, as will be described in more detail below in connection with FIG. 3, either opened or closed and the bypass controls the motor.

As is well known the drive and bypass contactors cannot both be closed when it is desired to run the motor. When it is desired to run the motor either the drive contactor is closed and the bypass contactor is open and the inverter is supplying A-C power to the motor; or the bypass contactor is closed and the drive contactor is open and the motor is directly connected to the A-C source. Of course, the drive and bypass contactors may both be open simultaneously.

The $\mu$-controller 18 contains code which simulates a state machine that determines the operating condition of the drive and bypass contactors. If it is desired to open the then closed bypass contactor and close the then open drive contactor the state machine peforms that operation. If the then open contactor is the bypass contactor and the then closed contactor is the drive contactor the state machine opens the drive contactor but does not close the bypass contactor.This state machine will be referred to hereinafter as the contactor operating condition state machine.

Figure 2:
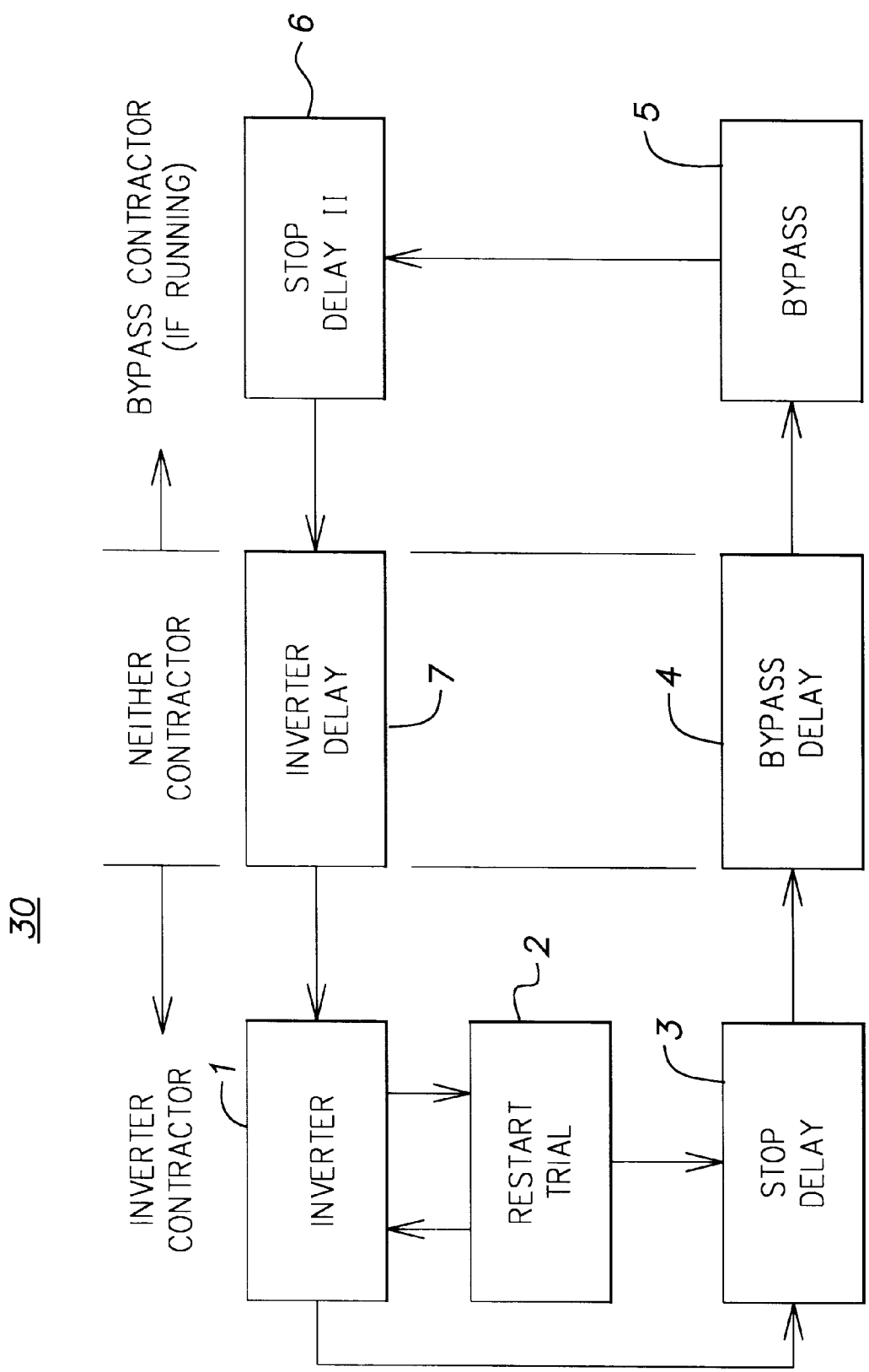
FIG. 2 shows a diagram of the contactor operating condition state machine.

Referring now to FIG. 2, there is shown a diagram of the contactor operating condition state machine 30. As is shown in FIG. 2 the state machine 30 is a loop having seven states which are numbered in FIG. 2 as 1–7 and each of the statesis labeled with the associated function. For purposes of explanation it is assumed that the bypass is initially operating in the drive operating condition, that is, the drive contactor is closed and the bypass contactor is open. Therefore the state machine 30 is in state 1 INVERTER. While state 1 is labeled "Inverter" in FIG. 2, the contactor associated with that state is referred to hereinafter as either the drive or inverter contactor.

If the state machine 30 determines that it is desired to open the drive contactor the state machine enters either state 2 RESTART TRIAL or state 3 STOP DELAY depending on how the desire to open the drive contactor has arisen. If the desire to switch the operating condition has arisen because the μ-controller 18 has detected an unacceptable condition in the A-C source such as an overvoltage or an undervoltage, or a possible malfunction of the inverter, the state machine 30 enters state 2.

In state 2, state machine 30 waits for a predetermined amount of time, which in one embodiment of the present invention was set at sixty (60) seconds, to ensure that the unacceptable condition or possible malfunction was not a temporary condition. If the predetermined amount of time elapses without the disappearance of the unacceptable condition or possible malfunction the state machine enters state 3 and power is removed from the coil of the drive or inverter contactor thereby opening that contactor. If the unacceptable condition or possible malfunction disappears before the predetermined amount of time elapses the state machine 30 returns back to state 1. Those skilled in the art will appreciate that such flexibility can not exist in those bypasses which use wired pilot devices and pushbuttons without incurring high cost.

If the desire to switch the operating condition has arisen because for example the user has depressed the BYPASS pushbutton 12b on keypad 12 then the state machine 30 enters state 3 directly from state 1. The function of state 3 STOP DELAY is to ensure that the motor is stopped before the μ-controller 18 allows power to be provided to the coil of the bypass contactor.

There are events in addition to those described above where it is desired to open the drive contactor and close the bypass contactor. Such an event may arise when the μ-controller 18 receives a true digital input signal from a remote location to switch the contactor from drive to bypass. As is well known, many HVAC systems have a master operating panel by which an authorized person can send such a signal to all of the bypasses in the facility to thereby run all of the A-C motors of the HVAC system at full speed to ventilate the facility in an emergency situation such as a fire.

Once the μ-controller 18 determines in state 3 that the motor has stopped, the state machine 30 proceeds to state 4 BYPASS DELAY. The function of state 4 is to ensure that the motor is fully demagnetized before the bypass contactor can be closed. As is well known even if power is disconnected from the input of a motor the rotor of the motor continues to spin for a period of time depending on the size of the motor. Thus the length of the delay in state 4 depends on the size of the motor. Once the delay in state 4 times out the state machine 30 enters state 5 BYPASS wherein the bypass contactor is available for closure.

As is described in more detail hereinafter in connection with FIG. 3, when state machine 30 enters state 5 the bypass contactor is initially open. The bypass contactor is closed in state 5 only after the μ-controller 18 receives the signal(s) associated with closure of that contactor.

The state machine 30 remains in state 5 until an event occurs indicating a desire to switch the operating condition of the contactors from the bypass contactor closed to the drive contactor closed. Such an event occurs when the user of the bypass depresses the DRIVE pushbutton 12a on keypad 12. Such an event may also occur if the bypass entered the bypass contactor closed operating condition as a result of receiving the true switch contactor from drive to bypass digital input signal and that signal becomes false.

Upon the occurrence of either of the foregoing events, the state machine 30 proceeds to state 6 STOP DELAY II wherein the state machine waits for the motor to stop. Once the μ-controller 18 has determined that the motor has stopped, the state machine 30 proceeds to state 7 INVERTER DELAY wherein state machine 30 waits for the motor to be fully demagnetized before drive contactor is closed. The delay in state 7 depends on the size of the motor. Once the delay in state 7 times out, state machine 30 proceeds to state 1 INVERTER wherein the coil to the drive or inverter contactor is energized and that contactor closes. It should be appreciated that the closure of the drive contactor does not start the motor. The μ-controller 18 must have at its input additional signals such as, for example, a run enable and a start command, before the inverter is allowed to provide power to the motor.

The μ-controller 18 also contains code which simulates another state machine that is only active when the bypass is in state 5 of the state machine 30. This state machine, which is referred to hereinafter as the bypass contactor operating condition state machine, controls the bypass when the bypass is in the bypass contactor operating condition. As was described above, the bypass contactor is either opened or closed when the bypass is in the bypass contactor operating condition.

Figure 3:
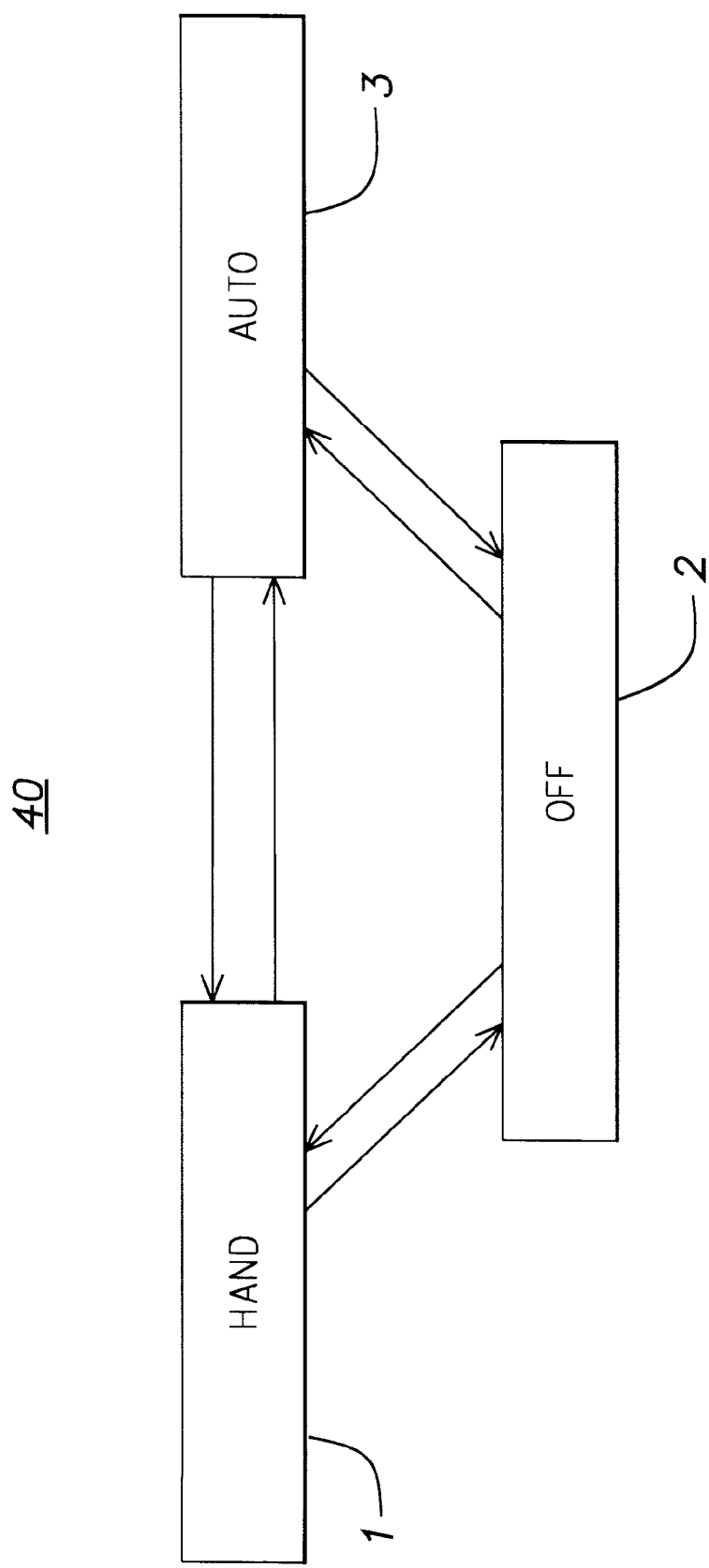
FIG. 3 shows a diagram of the bypass contactor closed state machine.

Referring now to FIG. 3, there is shown a diagram of the bypass contactor operating condition state machine 40. As is shown in FIG. 3, the state machine 40 is a loop that has three states which are numbered 1–3 in FIG. 3 and are also labeled with the associated operating mode, HAND, 20 AUTO and OFF of the bypass. The only function associated with state machine 40 is, as is described in more detail below, to allow the μ-controller 18 to control the bypass contactor to be either opened or closed.

The μ-controller 18 also includes a non-volatile memory (not shown in FIG. 1) which for example be an electrically erasable programmable read only memory (EEPROM). The EEPROM stores an indication of the last operating mode of the bypass operating condition if that mode was either AUTO or OFF. Therefore, when the bypass next enters the bypass operating condition the μ-controller 18 queries the EEPROM to determine if the bypass contactor operating condition state machine 40 was either in the AUTO or OFF operating mode when the μ-controller 18 last left the state machine 40.

The operation of the bypass contactor operating condition state machine 40 is now described assuming solely for purposes of explanation that the bypass is in the HAND operating mode when the bypass is in the bypass operating condition. Therefore state machine 40 is in state 1 HAND.

State machine 40 can move from state 1 HAND to state 2 OFF, that is, place the bypass in the passive OFF operating mode by opening the bypass contactor, upon the occurrence of one of a number of predetermined events. One such event is if the bypass determines that a fault condition has occurred, for example in the motor or elsewhere. Other events that cause the state machine 40 to move from state 1 to state 2 and thus cause the bypass contactor to open are either:

1. depressing of the DRIVE pushbutton 12a; or
2. depressing of the OFF pushbutton 12e; or
3. the changing from true to false of the remote location generated switch contactor from drive to bypass digital input signal to the μ-controller 18.

When state machine 40 is in state 2 OFF, the state machine can move either to state 3 AUTO or back to state 1 HAND depending on the occurrence of a predetermined event. The move of state machine 40 from state 2 OFF to state 1 HAND occurs when the user of the bypass depresses the HAND pushbutton 12f. The move of state machine 40 from state 2 OFF to state 3 AUTO occurs when the user of the bypass depresses the AUTO pushbutton 12d. It should be appreciated that the move of state machine 40 from the state 2 OFF to the state 3 AUTO only indicates a desire to run the motor in the AUTO operating mode. The motor does not start to run until there are additional inputs signals to the µ-controller 18.

When state machine 40 is in the state 3 AUTO, the state machine 40 can move either to state 1 HAND or to state 2 OFF depending on the occurrence of a predetermined event. The move of state machine 40 from state 3 AUTO to state 1 HAND occurs when the user of the bypass depresses the HAND pushbutton 12f. The move of state machine 40 from state 3 AUTO to state 2 OFF occurs when the user of the bypass depresses the OFF pushbutton 12e.

As was described above, when the µ-controller 18 leaves state machine 40, the last state of the state machine is stored in the EEPROM if that state is either state 2 OFF or state 3 AUTO. When the bypass next enters the bypass operating condition the state machine 40 returns to the state (OFF or AUTO) previously stored in the EEPROM. If state 1 HAND were stored in the EEPROM then the state machine 40 would return to that state. This is not acceptable as in the bypass operating condition the motor is directly connected to the A-C source. Therefore, if state machine 40 returned to state 1 HAND the motor would immediately start which might cause personal injury.

Returning once again to FIG. 2, it is seen that the contactor operating condition state machine 30 has a state 5 BYPASS. As was described above, the state machine 40 is only operative when the bypass is in the bypass operating condition. Therefore, state machine 40 can be thought as being a substate machine of state 5 BYPASS of state machine 30.

It should be appreciated that when the bypass is in the drive operating condition it is the inverter and associated logic that is controlling the motor. It should also be appreciated that when the bypass is in the bypass operating condition it is the state machine 40 that is in control and that the bypass contactor is not automatically closed when the bypass switches from drive operating mode to bypass operating mode. It should further be appreciated if the last state of the bypass contactor operating condition state machine 40 was AUTO, the next time that state machine 40 is entered, the motor only starts if the user of the bypass provides the necessary signals to µ-controller 18.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A bypass for an A-C motor, said bypass comprising:

(a) an inverter, said bypass operating in a first mode in which said inverter provides power to said motor and a second mode in which said inverter does not provide power to said motor;

(b) first and second contactors, said first contactor closed and said second contactor open when said bypass is operating in said first mode; and (c) a first state machine having a closed loop having a predetermined total number of states, said first state machine in a first state when said first contactor is closed and said second contactor is open, said first state machine entering a second state when said first state machine determines that one of a predetermined number of events the occurrence of which will result in the opening of said first contactor has occurred, said second state having a predetermined period of time for which said occurring one of said predetermined number of events must continue before said first state machine enters a third state wherein said first contactor is opened to thereby stop said motor.

2. The bypass of claim 1 wherein said first state machine returns from said second state to said first state when said occurring one of said predetermined events does not continue for said predetermined period of time.

3. The bypass of claim 1 wherein said first state machine enters a fourth state once said third state determines that said motor has stopped.

4. The bypass of claim 3 wherein said fourth state of said first state machine has a predetermined delay to ensure that said stopped motor is demagnetized before said first state machine enters a fifth state, said delay having a value depending on the size of said motor.

* * * * *